INVENTOR
FELIX FREDERICK EHRICH

Dec. 8, 1964  F. F. EHRICH  3,160,510

QUINACRIDONE PIGMENT COMPOSITIONS

Filed April 25, 1960  8 Sheets-Sheet 2

INVENTOR
FELIX FREDERICK EHRICH

ATTORNEY

INVENTOR
FELIX FREDERICK EHRICH
BY
ATTORNEY

Dec. 8, 1964  F. F. EHRICH  3,160,510
QUINACRIDONE PIGMENT COMPOSITIONS
Filed April 25, 1960  8 Sheets-Sheet 6

INVENTOR
FELIX FREDERICK EHRICH

BY Francis J. Crowley

ATTORNEY

Dec. 8, 1964   F. F. EHRICH   3,160,510
QUINACRIDONE PIGMENT COMPOSITIONS
Filed April 25, 1960   8 Sheets-Sheet 8

INVENTOR
FELIX FREDERICK EHRICH

BY *Francis J. Crawley*
ATTORNEY 3,160,510
QUINACRIDONE PIGMENT COMPOSITIONS
Felix Frederick Ehrich, Westfield, N.J., assignor to E. I. du Pont de Nemours and Company, Wilmington, Del., a corporation of Delaware
Filed Apr. 25, 1960, Ser. No. 24,483
18 Claims. (Cl. 106—288)

This invention relates to new quinacridone compositions and to methods of preparing these new compositions.

The quinacridone series of compounds has been described in various literature references and in U.S. patents. The present invention resides in the discovery that quinacridones and related compounds will, under certain conditions, mix with each other to form solid solutions which are quite different from both physical mixtures of such compounds and from the compounds themselves.

The term "solid solution" which has been used to characterize the new products of this invention is a well recognized term in the study of the properties of solid substances. It is defined in Webster's Dictionary as "a solid, homogeneous mixture of two or more constituents which may vary in composition between certain limits and remain homogeneous." This phenomenon is discussed at length in many physical chemistry texts such as in the "Textbook of Physical Chemistry"—Samuel Glasstone—2d edition, 1946, New York, p. 349 ff. In a solid solution, the molecules of the components enter into the same crystal lattice, usually, but not always, that of one of the components. The X-ray pattern of the resulting crystalline solid is characteristic of that solid and can be clearly differentiated from the pattern of a physical mixture of the same components in the same proportion. In such physical mixtures, the X-ray lines of each of the components can be distinguished, and the disappearance of many of these lines is one of the criteria of the formation of a solid solution.

In this invention, there are two important properties of the new products formed which render them particularly useful as pigments. In contrast to simple physical mixtures wherein the color is usually a direct function of the additive effects of the two or more components, these solid solutions give unexpected and unpredictable tinctorial values. It is impossible to generalize about the direction or degree of color shift, and this is additional evidence of the unpredictability of the phenomenon.

The second valuable property is a remarkable enhancement of lightfastness which frequently accompanies the formation of solid solution. In physical mixtures of two pigments, on exposure to light, the components show their individual behaviors frequently resulting in marked changes of hue as one fades more than the other. In contrast, the new solid solutions behave as single substances with respect to any change in hue and characteristically show superior lightfastness even in this field of quinacridones in which lightfastness is generally good.

Compounds which may be components of the solid solutions of this invention include the linear quinacridones having the following structural formula:

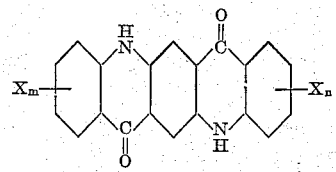

where X is F, Cl, Br, lower alkyl, lower alkoxy, or combinations of these groups, and $m$ and $n$ are integers of from 0–2, both limits being included. The lower alkyl substituents in the above formula include methyl, ethyl, propyl, isopropyl, butyl, isobutyl, and tert. butyl. The lower alkoxy substituents may be methoxy, ethoxy, propoxy, isopropoxy, butoxy, isobutoxy, and tert. butoxy. Linear quinacridones have been widely described in publications and patents, and in referring to these compounds the term "linear" is usually omitted. Therefore, the term "quinacridones" (QA), as used throughout the ensuing specification, refers to compounds possessing the linear quinacridone structure. Methods for producing linear quinacridones are disclosed in U.S. Patents 2,821,529 and 2,821,530.

Another group of compounds which may be components of the solid solutions of this invention include the quinacridonequinones, which have the following structural formula:

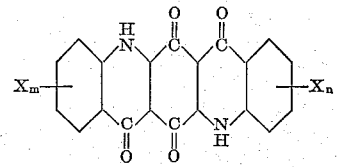

where the symbols X, $m$, and $n$ have the same significance as set forth above in connection with linear quinacridone. Quinacridonequinone, also known as quin(2,3b)acridine-6,7,13,14(5,12) tetrone, appears to have been first described by Sharvin in J. Rus. Phys. Chem. Soc. 47, 1260 (1915); C.A., vol. 9, 3056 (1915). It is commonly prepared by condensing benzoquinone with anthranilic acid in the presence of an excess of benzoquinone to give quinone dianthranilic acid which is, in turn, cyclized by heating in concentrated sulfuric acid to give quinacridonequinone. Substituted quinacridonequinones can be prepared by using the appropriately substituted anthranilic acid. For example, 2-amino-5-chloro benzoic acid can be used to produce a chlorinated derivative of quinacridonequinone.

A third group of related compounds which can be used as components of the solid solutions of this invention are the isoquinacridones having the following structural formula:

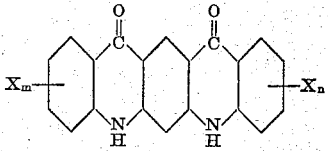

where X is F, Cl, Br, lower alkyl, lower alkoxy, or combinations of these groups, and $m$ and $n$ are integers of from 0–2, both limits being included. Examples of the lower alkyl substituents in the above formula are methyl, ethyl, isopropyl, and n-butyl. Examples of the lower alkoxy substituents are methoxy, ethoxy, propoxy, isobutoxy, and tert. butoxy. Isoquinacridone, also known as quin(3,2b)acridine-12,14(5,7H) dione, is described by Eckert and Seidel, J. prakt. Chem. 102, 338–40 (1921), who reacted a 4,6-dibromoisophthalic acid derivative with aniline to obtain 4,6-dianilinoisophthalic acid which was cyclized in a mixture of $PCl_5$ and $AlCl_3$ to the isoquinacridone. Substituted isoquinacridones can be made by the use of appropriately substituted aniline in this reaction.

The compositions of the present invention comprise solid solutions of components having formulae of the group consisting of:

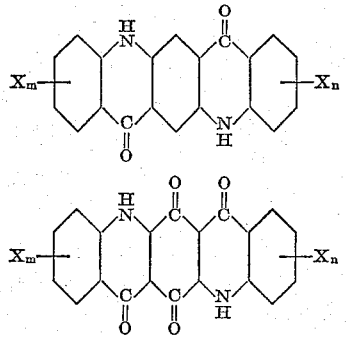

and

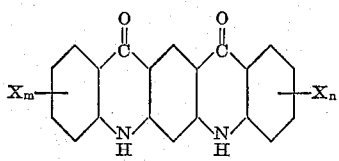

where X is F, Cl, Br, lower alkyl, lower alkoxy, or combinations of these groups, and m and n are integers of from 0–2, both limits being included. Preferred components for the solid solutions are the unsubstituted compounds of the above formulae and their symmetrically disubstituted derivatives wherein the substituents are of the same atom or group.

The solid solutions of this invention can be prepared by contacting a physical mixture of the quinacridone components with an organic solvent, such as a dimethylformamide. Details of this method will appear hereinafter. The proportions of the components used are not at all critical when it is not undesirable to have a portion of one or more of the components in admixture with the solid solution end product. However, pure products, i.e., those which are substantially 100% solid solution, form as a result of adjusting the proportions so that all of the components can enter the same crystal lattice. These latter materials are the preferred compositions of this invention.

Some of the outstanding series of solid solutions which are part of this invention are set forth below:

(1) Solid solutions containing components from the group consisting of unsubstituted quinacridone and 4,11-disubstituted quinacridones wherein both substituents are of the same atom or radical selected from the group consisting of F, Cl, Br, $CH_3$, and $OCH_3$.
(2) Solid solutions containing components from the group consisting of unsubstituted quinacridone and 2,9-disubstituted quinacridones wherein both substituents are of the same atom or radical selected from the group consisting of F, Cl, Br, $CH_3$, and $OCH_3$.
(3) Solid solutions containing as components quinacridonequinone and/or symmetrically disubstituted quinacridonequinones wherein both substituents are of the same atom or radical selected from the group consisting of F, Cl, Br, $CH_3$, and $OCH_3$, usually in combination with linear quinacridones.
(4) Solid solutions containing as components isoquinacridone and/or symmetrically disubstituted isoquinacridones wherein both substituents are of the same atom or radical selected from the group consisting of F, Cl, Br, $CH_3$, and $OCH_3$, usually in combination with linear quinacridones or with quinacridonequinones.

Other components which are especially suitable for entering into the solid solutions of this invention, such as those described in the above list, are 3,10-disubstituted quinacridones and tetrasubstituted quinacridones, where the substituents in such compounds are of the same atom or radical.

In more specific embodiments of this invention, the following represent some of the preferred solid solutions of this invention:

(1) Solid solutions comprising quinacridone and 4,11-dichloroquinacridone, particularly the substantially pure solid solutions which are brilliant scarlet pigments possessing excellent lightfasteness. Such pure solid solutions contain 55–75% by weight of quinacridone, the balance (25–45%) being 4,11-dichloroquinacridone. A specific composition which is most preferred is a substantially pure solid solution containing 60% quinacridone and 40% 4,11-dichloroquinacridone. The X-ray diffraction pattern of these substantially pure solid solutions is given in Table 3.
(2) Solid solutions comprising quinacridone and 2,9-dichloroquinacridone, particularly the substantially pure solid solutions which are brilliant magenta pigments possessing excellent lightfasteness. Such pure solid solutions contain 58–68% quinacridone, the balance (42–52%) being 2,9-dichloroquinacridone. A specific composition which is most preferred is a substantially pure solid solution containing 60% quinacridone and 40% 2,9-dichloroquinacridone. The X-ray diffraction pattern of these substantially pure solid solutions is given in Table 7.
(3) Solid solutions comprising quinacridone and 2,9-dimethylquinacridone, particularly the substantially pure solid solutions which are brilliant magenta pigments possessing excellent lightfastness. Such pure solid solutions contain 52–62% quinacridone, the balance (38–48%) being 2,9-dimethylquinacridone. A specific composition which is most preferred is a substantially pure solid solution containing 60% quinacridone and 40% 2,9-dimethylquinacridone. The X-ray diffraction pattern of these substantially pure solid solutions is the same as that shown in Table 3. A typical pigment of this type is shown in Example 11B.
(4) Solid solutions comprising 2,9-dimethylquinacridone and 2,9-difluoroquinacridone, particularly the substantially pure solid solutions which are very bluish red pigments possessing excellent lightfastness. Such pure solid solutions contain 64–80% 2,9-dimethylquinacridone, the balance (20–36%) being 2,9-difluoroquinacridone. A specific composition which is most preferred is a substantially pure solid solution containing 65% 2,9-dimethylquinacridone and 35% 2,9-difluoroquinacridone. The X-ray diffraction pattern of these substantially pure solid solutions is given in Table 6. A typical pigment of this type is shown in Example 10E.
(5) Solid solutions comprising 2,9-dichloroquinacridone and 2,9-difluoroquinacridone, particularly the substantially pure solid solutions which are very bluish red pigments possessing excellent lightfastness. Such pure solid solutions contain 46–75% 2,9-dichloroquinacridone, the balance (25–54%) being 2-9-difluoroquinacridone. A specific composition which is most preferred is a substantially pure solid solution containing 50% 2,9-dichloroquinacridone and 50% 2,9-difluoroquinacridone. The X-ray diffraction pattern of these substantially pure solid solutions is given in Table 5. A typical pigment of this type is shown in Example 9F.
(6) Solid solutions comprising quinacridone and quinacridonequinone, particularly the substantially pure solid solutions which are lightfast pigments of a yellowish red tint. Such pure solid solutions contain 55–65% quinacridone, the balance (35–44%) being quinacridonequinone. A specific composition which is most preferred is a substantially pure solid solution containing 60% quinacridone and 40% quinacridonequinone. The X-ray diffraction pattern of these substantially pure solid solutions is given in Example 14. Typical pigments of this type are shown in Example 15.

The preparation of physical mixtures of colored pigments to obtain properties intermediate between those of the components of the mixture is a very old art. In general, the properties of such physical mixtures are predictable from the known properties of the components. Thus, for instance, one may prepare a simple physical mixture containing about 60% gamma phase quinacridone (a bluish red pigment) and 40% alpha phase 4,11-dichloroquinacridone (a yellowish red pigment) to obtain a red pigment which is less blue than the unsubstituted quinacridone but still a bluish-red pigment. The lightfastness is intermediate between that of the very lightfast gamma quinacridone and the markedly inferior lightfastness of the alpha 4,11-dichloroquinacridone. In the X-ray diffraction pattern of the mixture, substantially all of the individual lines of the two components can be identified.

On the other hand, if this mixture is suspended in sufficient dimethylformamide to give a fluid suspension and the suspension is heated to the boil and maintained under reflux for an hour or more, the product which may be isolated therefrom is a brilliant scarlet or yellowish-red pigment which exhibits an X-ray diffraction pattern which is characteristically different from the patterns of the physical mixture or either of its components. Moreover, this new scarlet pigment exhibits a degree of lightfastness substantially equal to that of the pure unsubstituted quinacridone, thus showing none of the degradation in lightfastness characteristic of the simple physical mixture. In all three of the properties mentioned, color, X-ray diffraction pattern, and lightfastness, the new product exhibits characteristics which could not be predicted from the known characteristics of its components.

The disappearance of the X-ray diffraction patterns of the components and the appearance of a characteristically new pattern is indicative of the fact that the two components have crystallized together to form a solid solution with a new crystal structure. It is now found that this ability of quinacridone analogs to crystallize together to form solid solutions is characteristic of many mixtures of such analogs. Such solid solutions may be distinguished from physical mixtures by the characteristic X-ray patterns which may comprise an entirely new pattern as described above, or may comprise essentially the pattern of one pure component, the patterns of the other component (or components) having disappeared. In many cases, the colors of such solid solutions are quite unpredictable from the known colors of the components. In all cases examined, solid solutions, when formed, exhibit some properties not directly predictable from the properties of the components.

If a third component, 4,11-difluoroquinacridone, is introduced into solid solution with quinacridone and 4,11-dichloroquinacridone by refluxing a mixture of about 55% quinacridone, 20% dichloroquinacridone, and 25% difluoroquinacridone, the resulting product has the same X-ray diffraction pattern and essentially the same tinctorial properties as the two-component system. This X-ray pattern is found to be essentially that of the 4,11-difluoroquinacridone, and it is found to exist over a broad range of combinations and even after the introduction of a suitable amount of 4,11-dimethylquinacridone as a fourth component.

On the other hand, within certain limits more fully set forth below, solid solutions of these components exist in a second crystal phase which is isomorphous with one of the known phases of 4,11-dimethylquinacridone. There is also some evidence of still a third phase which is similar to one phase of 4,11-dichloroquinacridone.

In an analogous manner, a similar series of solid solutions has been identified in the group comprising quinacridone and its 2,9-disubstituted derivatives. Other solid solutions exist in the group of quinacridone and its 3,10-disubstituted derivatives as well as the tetrasubstituted derivatives. There are numerous illustrations of such combinations in the examples which follow.

Figure 1:
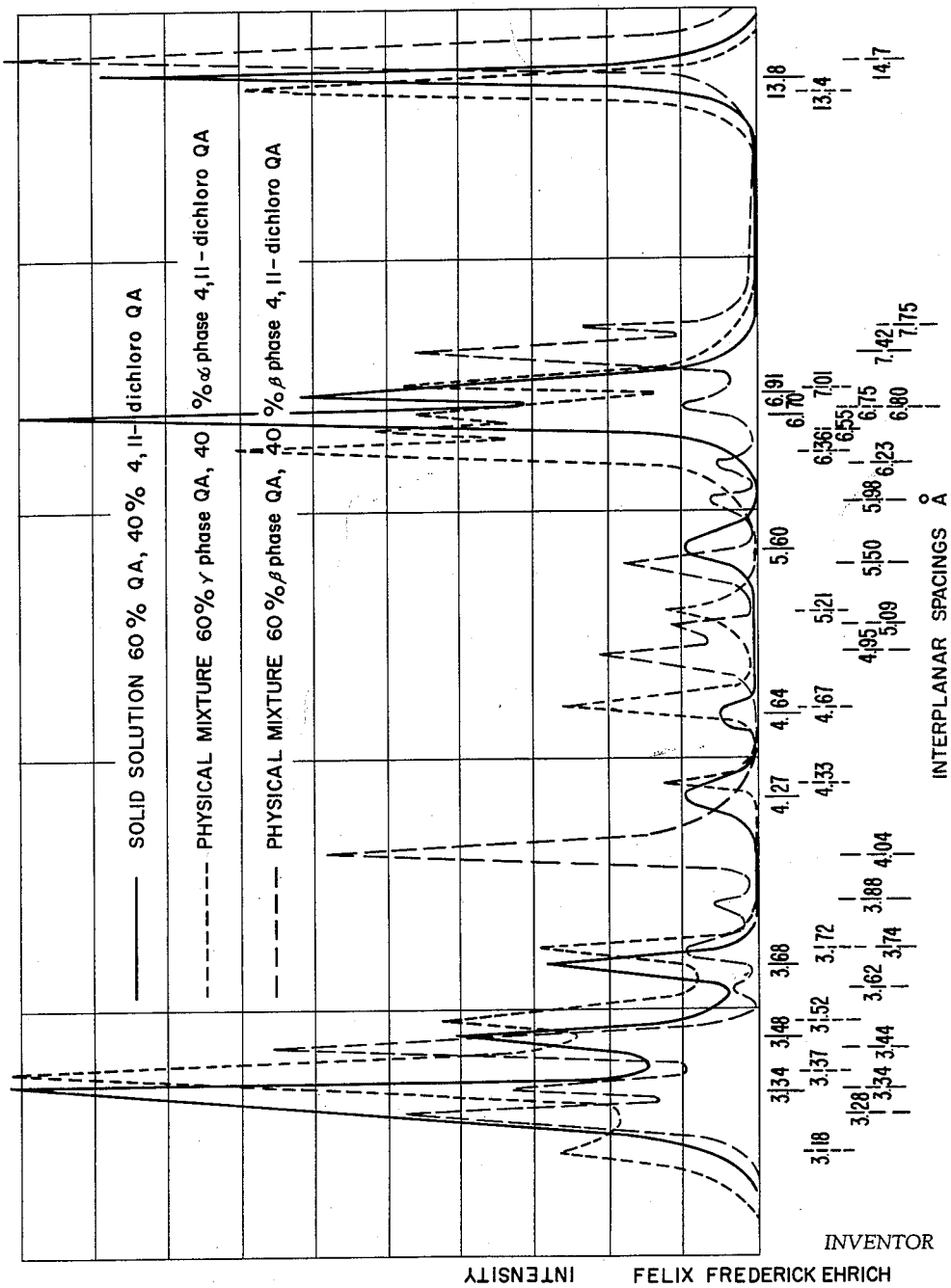
FIGS. 1–6 are diagrams which compare the X-ray diffraction pattern of solid solutions of this invention with the X-ray diffraction pattern of physical mixtures of the individual components making up the solid solutions.

The X-ray diffraction patterns, on which much reliance is placed for evidence of solid solution, are obtained by the well known powder technique in which a Geiger counter is used to record the intensity of the diffracted beam which is translated automatically into a curve on which the horizontal axis records the angle of diffraction ($2\theta$) and the vertical axis, the corresponding intensity of the beam. All patterns were obtained using the Cu K$\alpha$ radiation and have been recorded both as $2\theta$ (which may change with type of radiation) and as interplanar spacings in Angstrom units (A.) (which are independent of the type of radiation). Two types of diagrams are used to show the X-ray patterns. FIG. 1 is an idealized curve with background scatter eliminated and the relative intensities adjusted to a maximum of 100%. FIGS. 2–6 are bar graphs which are still further idealized but much easier to use in direct comparisons. Both types of patterns are recognized in the literature. For purposes of definition of products, the interplanar spacings will be used. In general, the values which have been recorded to three significant figures, are accurate to within about 2% and are usually reproducible on a given sample to a variation of less than 1%. Cognizance should be taken of this variance when interpreting the specification and claims.

For a clearer understanding of the invention, the following specific examples are given. These examples are intended to be merely illustrative of the invention and not in limitation thereof. Unless otherwise specified, all parts are by weight.

EXAMPLE 1

60 parts of quinacridone and 40 parts of 4,11-dichloroquinacridone are suspended in about 3000 parts of dimethylformamide in a reactor equipped with a stirrer and fitted for external heating and also fitted with a suitable reflux condenser. The fluid slurry, well stirred at all times, is heated to the boiling point and maintained under mild reflux for about 3 to 4 hours. Stirring is continued while cooling and the pigment is finally isolated by filtering; the excess solvent is washed out of the filter cake with water, and the paste dried to give a quantitative yield of a brilliant scarlet pigment which is highly resistant to fading under the influence of light when dispersed in the usual coating composition vehicles. This product also gives an X-ray diffraction pattern which is characterized by four strong lines with interplanar spacings of 13.8 A., 6.91 A., 6.70 A., and 3.34 A., along with five lines of lesser intensity with interplanar spacings of 5.60 A., 4.64 A., 4.27 A., 3.68 A., and 3.48 A.

To demonstrate the unique character of the solid solution shown above, physical mixtures of various phases of quinacridone (QA) and 4,11-dichloroquinacridone (4,11-dichloro QA) have been prepared in the 60/40 ratio and the properties compared with the product of Example 1. Thus, there is shown a physical mixture of 60% gamma phase quinacridone and 40% alpha phase 4,11-dichloroquinacridone. The characteristic X-ray diffraction lines of this mixture are shown in Table 1, along with the identification of the several lines which makes it clear that each component has retained its identity. In like manner, there is shown a physical mixture containing 60% beta phase quinacridone and 40% beta phase 4,11-dichloroquinacridone. Table 2 summarizes the X-ray diffraction lines of the latter mixture, and, again, it is clear that the components retained their identities.

When either of the above-described physical mixtures is treated with dimethylformamide as described above, the resulting product is the same as that shown in Example 1. Hence, in this Example 1, the starting phases of the components were not specified since they are immaterial to the final result of a product having a characteristic X-ray pattern which is clearly different from that of either mixture. Its X-ray pattern is summarized in Table 3.

FIGURE 1 is a drawing of three X-ray patterns in which the dotted line represents the pattern of the physical mixture of 60% γ-phase QA, 40% α-phase 4,11-dichloro QA; the dashed line, the pattern of the physical mixture of 60% β-phase QA, 40% β-phase 4,11-dichloro QA; and the solid line, the pattern of the solid solution of of Example 1.

Figure 2:
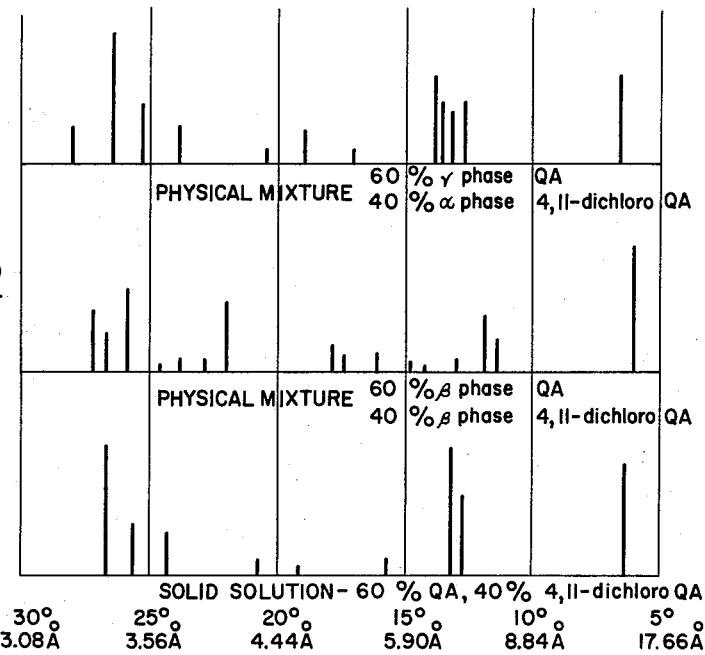

FIGURE 2 is a schematic diagram of the same X-ray patterns in the form of bar graphs instead of curves.

*Table 1*

PHYSICAL MIXTURE 60% γ-PHASE QA, 40% α-PHASE 4,11-DICHLORO QA

| Diffraction Angle 2θ (degrees) | Interplanar Spacing (angstroms) | Relative Intensity | Identification |
|---|---|---|---|
| 6.6 | 13.4 | Strong | Gamma QA. |
| 12.6 | 7.01 | do | 4,11-dichloro QA. |
| 13.1 | 6.75 | do | Gamma QA. |
| 13.5 | 6.55 | do | Do. |
| 13.9 | 6.36 | do | Do. |
| 17.0 | 5.21 | Weak | Do. |
| 19.0 | 4.67 | Intermediate | Dichlor QA. |
| 20.5 | 4.33 | Weak | Gamma QA. |
| 23.9 | 3.72 | Intermediate | Do. |
| 25.3 | 3.52 | Strong | Dichloro QA. |
| 26.4 | 3.37 | do | Gamma QA. |
| 28.0 | 3.18 | Intermediate | Dichloro QA. |

*Table 2*

PHYSICAL MIXTURE 60% β-PHASE QA, 40% β-PHASE 4,11-DICHLORO QA

| Diffraction Angle 2θ (degrees) | Interplanar Spacing (angstroms) | Relative Intensity | Identification |
|---|---|---|---|
| 6.0 | 14.7 | Strong | Beta QA. |
| 11.4 | 7.75 | Weak | Dichloro QA. |
| 11.9 | 7.42 | Strong | Beta QA. |
| 13.0 | 6.80 | Weak | Dichloro QA. |
| 14.2 | 6.23 | do | Do. |
| 14.8 | 5.98 | do | Do. |
| 16.1 | 5.50 | do | Beta QA. |
| 17.4 | 5.09 | do | Dichloro QA. |
| 17.9 | 4.95 | do | Do. |
| 22.0 | 4.04 | Strong | Beta QA. |
| 22.9 | 3.88 | Weak | Dichloro QA. |
| 23.8 | 3.74 | do | Do. |
| 24.6 | 3.62 | do | Do. |
| 25.9 | 3.44 | Strong | Do. |
| 26.7 | 3.34 | Intermediate | Do. |
| 27.2 | 3.28 | Strong | Beta QA. |

*Table 3*

SOLID SOLUTION 60% QA, 40% 4,11-DICHLORO QA

| Diffraction Angle 2θ (degrees) | Interplanar Spacing (angstroms) | Intensity |
|---|---|---|
| 6.4 | 13.8 | Strong. |
| 12.8 | 6.91 | Do. |
| 13.2 | 6.70 | Do. |
| 15.8 | 5.60 | Weak. |
| 19.1 | 4.64 | Do. |
| 20.8 | 4.27 | Do. |
| 24.2 | 3.68 | Intermediate. |
| 25.6 | 3.48 | Do. |
| 26.7 | 3.34 | Strong. |

The relative amounts of the ingredients used in Example 1 may be varied with the following results:

(a) 55 parts quinacridone
    45 parts 4,11-dichloroquinacridone yields a product which exhibits a principal X-ray pattern as shown in Example 1, together with a weak pattern of 4,11-dichloroquinacridone. The product is recognized as a mixture of the solid solution with excess 4,11-dichloroquinacridone. It exhibits a somewhat yellower shade than the pure solid solution and is slightly inferior in light-fastness.

(b) 70 parts quinacridone
    30 parts 4,11-dichloroquinacridone

The excess of pure quinacridone in the solid solution shows up in the X-ray pattern of this product as well as in the bluer shade. The product has excellent light-fastness.

EXAMPLE 2

In an alternative method of preparing the solid solution shown in Example 1, the components are pretreated by dissolving them in concentrated sulfuric acid whereafter they are coprecipitated by the rapid addition of water. This pretreatment permits the use of a wider range of proportions in forming the solid solutions.

60 parts of quinacridone and 40 parts of 4,11-dichloroquinacridone are added to 1800 parts of concentrated $H_2SO_4$ and stirred at room temperature until solution is complete. The solution is poured rapidly into about 10,000 parts of cold water under gentle agitation. The precipitate is filtered, washed acid free, and dried, after which it is suspended in 3000 parts of dimethylformamide in a vessel equipped with a reflux condenser, and heated at the boiling point for four hours. It is then filtered from the solvent, washed free of solvent with water, and dried. The resulting product resembles that of Example 1 in all respects.

If the procedure of this example is followed, all products within the range of about 52% quinacridone to about 75% quinacridone (the balance being 4,11-dichloroquinacridone) are solid solutions and have the typical X-ray pattern and brilliant scarlet hue of the principal product of Example 1.

EXAMPLE 3

The following binary combinations (parts by weight), when prepared in the manner set forth in Example 2 (acid pasting followed by reflux in dimethylformamide) yield products showing essentially the same X-ray patterns and very similar color characteristics to the products of Examples 1 and 2:

|  | Quinacridone | 4,11-Dichloroquinacridone | 4,11-Difluoroquinacridone | 4,11-Dimethylquinacridone |
|---|---|---|---|---|
| 3A |  | 35 | 65 |  |
| 3B | 66 |  | 34 |  |
| 3C | 80 |  |  | 20 |

Figure 3:
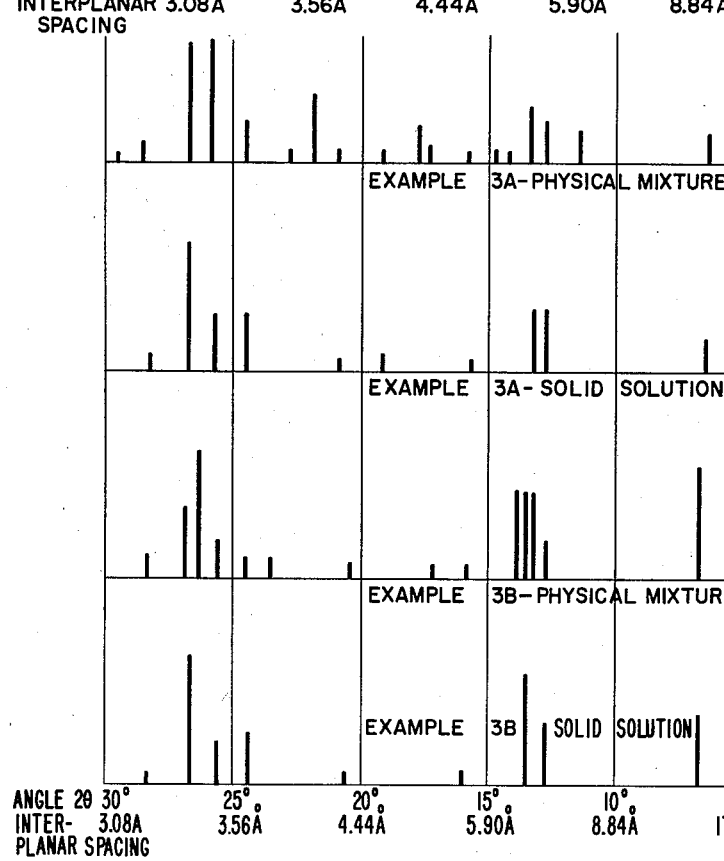

In each case, physical mixtures of the separate components yield X-ray patterns in which the patterns of the components can be distinguished. Also, the corresponding colors of such physical mixtures are substantially predictable. The X-ray patterns of 3A and 3B above, both as mixtures and as solid solutions, are shown in FIGURE 3.

EXAMPLE 4

The following mixtures of more than two components (parts by weight) are dissolved in sulfuric acid, drowned in water, isolated and dried, and then treated in boiling dimethylformamide as shown in detail in Example 2:

|    | Quinacridone | 4,11-Dichloroquinacridone | 4,11-Difluoroquinacridone | 4,11-Dimethylquinacridone |
|----|----|----|----|----|
| 4A | 60 | 20 | 20 | -- |
| 4B | 70 | 20 | 10 | -- |
| 4C | 60 | 10 | 30 | -- |
| 4D | 50 | 30 | 20 | -- |
| 4E | 70 | 15 | -- | 15 |
| 4F | 60 | 30 | -- | 10 |
| 4G | 80 | 10 | -- | 10 |
| 4H | 75 | -- | 10 | 15 |
| 4I | 60 | -- | 30 | 10 |
| 4J | 50 | 30 | 10 | 10 |

Figure 4:
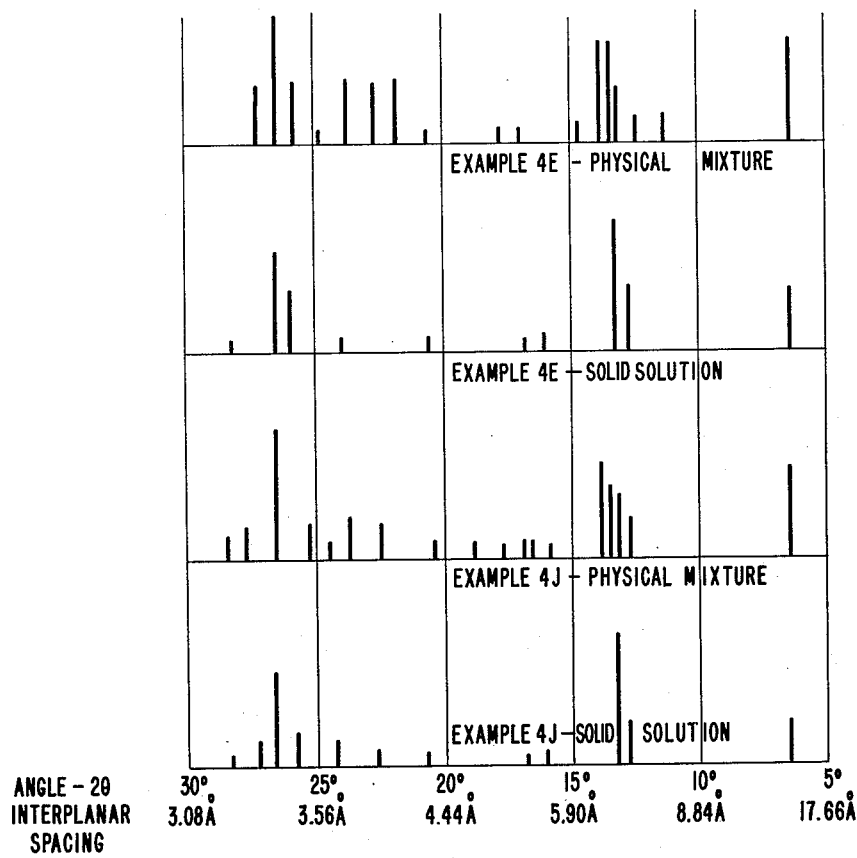

The final product in each case is a solid solution exhibiting substantially the same X-ray pattern as the product of Example 1. X-ray patterns of physical mixtures and the solid solutions for 4E and 4J are shown in FIGURE 4.

EXAMPLE 5

The following binary mixtures (parts by weight) are dissolved in sulfuric acid, drowned in water, isolated and dried, and then treated in boiling dimethylformamide as in Example 2.

|    | Quinacridone | 4,11-Dichloroquinacridone | 4,11-Difluoroquinacridone | 4,11-Dimethylquinacridone |
|----|----|----|----|----|
| 5A | 15 | -- | -- | 85 |
| 5B | -- | 50 | -- | 50 |
| 5C | -- | -- | 15 | 85 |

The resulting products are solid solutions which exhibit the following X-ray diffraction pattern:

*Table 4*

| Diffraction Angle 2θ (degrees) | Interplanar Spacing (angstroms) | Intensity |
|----|----|----|
| 12.3 | 7.19 | Strong. |
| 12.7 | 6.96 | Do. |
| 14.3 | 6.18 | Weak. |
| 16.7 | 5.30 | Do. |
| 17.5 | 5.06 | Do. |
| 22.6 | 3.93 | Strong. |
| 24.3 | 3.66 | Weak. |
| 24.7 | 3.60 | Do. |
| 25.9 | 3.44 | Do. |
| 27.2 | 3.28 | Strong. |
| 28.2 | 3.16 | Weak. |

Figure 5:
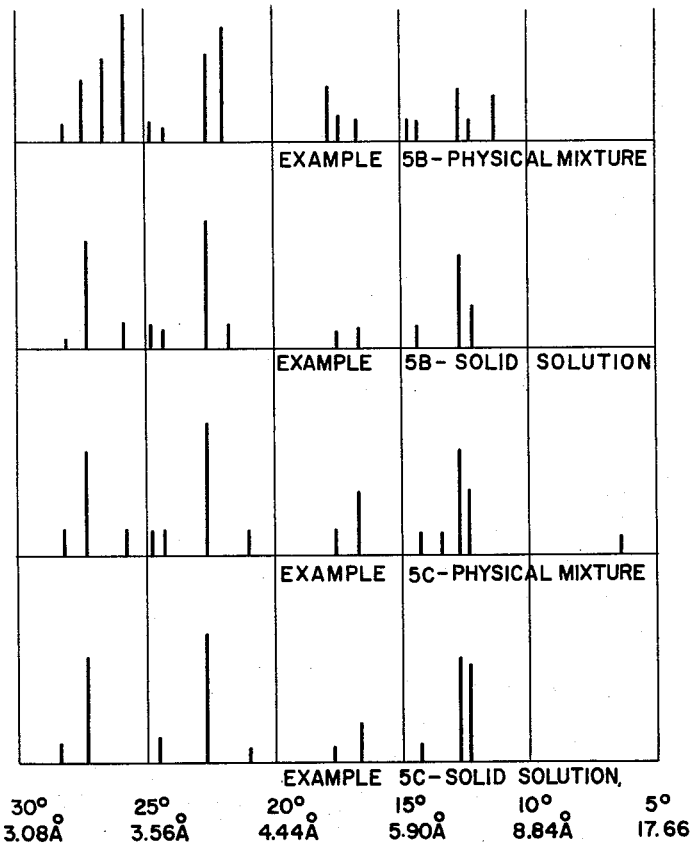

This pattern for the solid solution is typical of 4,11-dimethylquinacridone with no evidence of the additional ingredients, whereas comparable physical mixtures show X-ray patterns in which the individual components can be identified. The products are brilliant red pigments. The X-ray patterns of 5B and 5C, both as physical mixtures and as solid solutions, are shown in FIGURE 5.

EXAMPLE 6

The following mixtures (parts by weight) containing three components, when treated by the process of Example 2, give solid solutions exhibiting the X-ray pattern shown in Example 5.

|    | Quinacridone | 4,11-Dichloroquinacridone | 4,11-Difluoroquinacridone | 4,11-Dimethylquinacridone |
|----|----|----|----|----|
| 6A | 10 | -- | 15 | 75 |
| 6B | 10 | -- | 10 | 80 |
| 6C | 10 | 25 | -- | 65 |
| 6D | 10 | 15 | -- | 75 |
| 6E | 20 | 20 | -- | 60 |
| 6F | -- | 25 | 10 | 65 |
| 6G | -- | 40 | 10 | 50 |
| 6H | -- | 10 | 20 | 70 |

Figure 6:
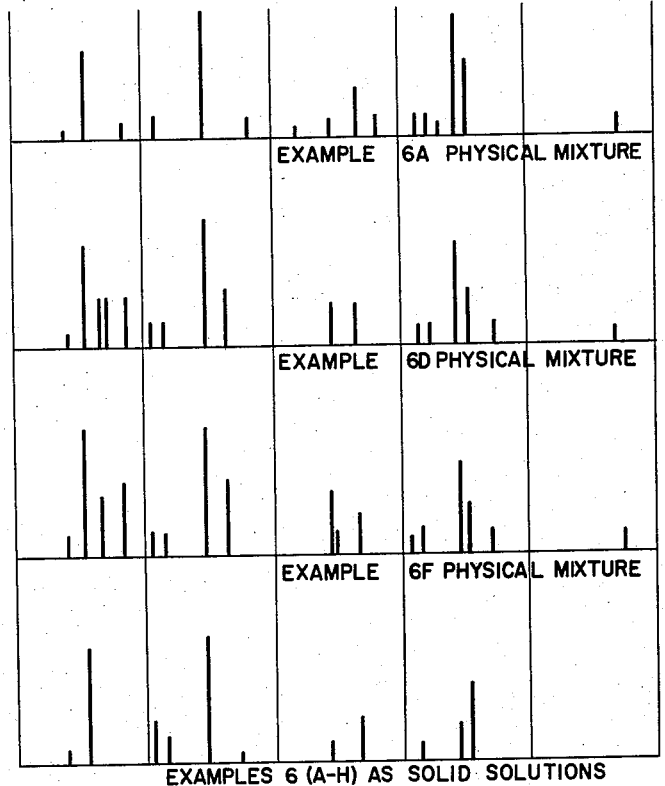

These products are all bright red pigments. The X-ray patterns differ from those of the corresponding physical mixtures in which the characteristic lines of the several components can be identified. The X-ray patterns of the physical mixtures corresponding to 6A, 6D, and 6F, together with the solid solution pattern which is substantially identical in each case are shown in FIGURE 6. These solid solutions are similar in X-ray pattern to those of Example 5.

EXAMPLE 7

This example illustrates an alternative method of pretreating the components prior to contact with the solvent which converts the components into a solid solution. This pretreatment involves co-milling the components in the presence of salt.

60 parts of quinacridone and 40 parts of 4,11-dichloroquinacridone together with 900 parts of sodium chloride are charged to a ball mill containing 15,000 parts of "Cylpebs" (steel rods ½" x 1") and of such a size that the mill is about 60% full when the complete charge is in it. The mill is rotated at about 70% of critical speed for 12–18 hours and the powder discharged from the mill through a suitable screen which will retain the grinding elements.

This powder is added to about 1350 parts of dimethylformamide and stirred until thoroughly wet. The paste is then added to about 10,000 parts of 5% $H_2SO_4$, heated to the boil for about 30 minutes, filtered hot, washed acid free, and dried to give a brilliant scarlet pigment in every way comparable to the pigments of Examples 1 and 2.

EXAMPLE 8

Another series of solid solutions was prepared by treating the following compositions by the method of Example 2 (acid pasting followed by refluxing in dimethylformamide):

|    | Quinacridone | 4,11-Dichloroquinacridone | 4,11-Difluoroquinacridone | 4,11-Dimethylquinacridone |
|----|----|----|----|----|
| 8A | 10 | 90 | -- | -- |
| 8B | -- | 80 | 20 | -- |
| 8C | -- | 90 | -- | 10 |
| 8D | 10 | 80 | 10 | -- |

These products are solid solutions having substantially the same X-ray pattern which is essentially that of beta phase 4,11-dichloroquinacridone.

As a modification of this example, a mixture of 90 parts beta phase 4,11-dichloroquinacridone and 10 parts gamma phase quinacridone has been milled with salt as in Example 7, but with the inclusion of about 15 parts of dimethylformamide in the mill followed by isolation without further treatment with solvent to give a product of scarlet hue exhibiting the X-ray diffraction pattern of beta phase 4,11-dichloroquinacridone.

EXAMPLE 9

The following mixtures of quinacridone and 2,9-disubstituted quinacridones are added in each case to 1800 parts of concentrated $H_2SO_4$ and stirred at room temperature until solution is complete. The solution is poured rapidly into about 10,000 parts of cold water with good agitation. The precipitate is filtered, washed acid free, and dried, after which it is suspended in about 3000 parts of dimethylformamide and heated at the boiling point under reflux for four hours. It is then filtered from the solvent, washed free of solvent with water and dried.

|     | Quinacridone | 2,9-Dichloro-quinacridone | 2,9-Difluoro-quinacridone | 2,9-Dimethyl quinacridone |
|-----|------|------|------|------|
| 9A  | 25   | 75   |      |      |
| 9B  | 15   | 60   |      | 25   |
| 9C  |      | 45   |      | 55   |
| 9D  |      | 15   | 55   | 30   |
| 9E  |      | 50   | 25   | 25   |
| 9F  |      | 50   | 50   |      |
| 9G  | 15   | 60   | 25   |      |
| 9H  | 10   | 45   | 25   | 20   |

Upon examination by X-ray diffraction, these products are found to have substantially identical diffraction patterns characterized in the following Table 5:

Table 5

| Diffraction Angle $2\theta$ (degrees) | Interplanar Spacing (angstroms) | Intensity |
|------|------|------|
| 5.3  | 16.6 | Strong. |
| 10.7 | 8.26 | Weak. |
| 15.0 | 5.90 | Strong. |
| 16.2 | 5.47 | Weak. |
| 18.8 | 4.72 | Do. |
| 21.5 | 4.13 | Do. |
| 22.5 | 3.95 | Do. |
| 23.5 | 3.78 | Strong. |
| 24.5 | 3.63 | Weak. |
| 26.8 | 3.32 | Do. |
| 27.8 | 3.21 | Strong. |

This pattern is isomorphous with that of the beta phase of 2,9-dichloroquinacridone. As in the previous examples, physical mixtures yield X-ray patterns in which the individual components can be readily recognized. The products of this example are intense, very bluish red pigments of excellent lightfastness.

EXAMPLE 10

Using the same method of treatment shown in Example 9, solid solutions were prepared from the following mixtures:

|     | Quinacridone | 2,9-Dichloro-quinacridone | 2,9-Difluoro-quinacridone | 2,9-Dimethyl-quinacridone |
|-----|------|------|------|------|
| 10A | 15   |      |      | 85   |
| 10B | 10   | 25   |      | 65   |
| 10C |      | 25   |      | 75   |
| 10D |      | 15   | 10   | 75   |
| 10E |      |      | 35   | 65   |
| 10F | 10   |      | 25   | 65   |
| 10G | 10   | 10   | 15   | 65   |

When the resulting products are examined by X-ray diffraction, they all have similar patterns characterized in the following Table 6:

Table 6

| Diffraction Angle $2\theta$ (degrees) | Interplanar Spacing (angstroms) | Intensity |
|------|------|------|
| 5.6  | 15.8 | Strong. |
| 11.1 | 7.96 | Intermediate. |
| 14.0 | 6.32 | Strong. |
| 14.8 | 5.98 | Weak. |
| 15.3 | 5.79 | Intermediate. |
| 18.3 | 4.84 | Weak. |
| 22.4 | 3.97 | Intermediate. |
| 24.2 | 3.68 | Weak. |
| 25.6 | 3.48 | Intermediate. |
| 27.4 | 3.25 | Strong. |
| 28.2 | 3.16 | Weak. |

This pattern is isomorphous with that of the alpha phase of 2,9-dimethylquinacridone. These products are intense, very bluish red pigments of excellent lightfastness.

EXAMPLE 11

Still another series of solid solutions is obtained by treating mixtures of the composition shown in the following table according to the method of Example 9:

|     | Quinacridone | 2,9-Dichloro-quinacridone | 2,9-Difluoro-quinacridone | 2,9-Dimethyl-quinacridone |
|-----|------|------|------|------|
| 11A | 60   | 40   |      |      |
| 11B | 65   |      |      | 35   |
| 11C |      | 25   | 75   |      |
| 11D | 55   | 35   |      | 10   |
| 11E | 60   | 15   |      | 25   |
| 11F | 50   |      | 20   | 30   |
| 11G | 40   |      | 45   | 15   |
| 11H |      | 5    | 90   | 5    |
| 11I | 15   | 10   | 75   |      |
| 11J | 40   | 15   | 45   |      |
| 11K | 50   | 30   | 20   |      |
| 11L | 50   | 15   | 20   | 15   |

When these products are examined by X-ray diffraction, they all have similar patterns characterized in the following Table 7:

Table 7

| Diffraction Angle $2\theta$ (degrees) | Interplanar Spacing (angstroms) | Intensity |
|------|------|------|
| 5.9  | 15.0 | Strong. |
| 11.9 | 7.42 | Intermediate. |
| 13.8 | 6.41 | Strong. |
| 14.9 | 5.94 | Intermediate. |
| 18.1 | 4.90 | Weak. |
| 22.5 | 3.95 | Intermediate. |
| 24.7 | 3.60 | Weak. |
| 26.6 | 3.35 | Do. |
| 27.6 | 3.23 | Strong. |
| 28.2 | 3.16 | Weak. |

This pattern is isomorphous with that of alpha phase 2,9-difluoroquinacridone. These products are brilliant magenta pigments possessing excellent lightfastness.

Figure 7:
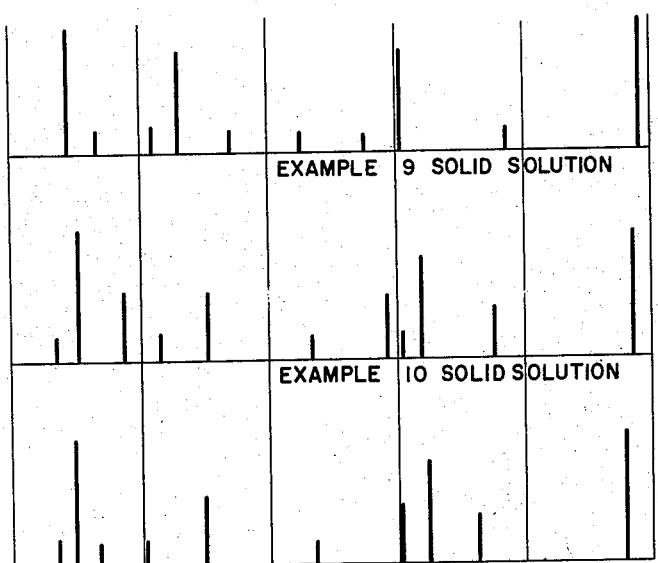
FIG. 7 is a diagram of the X-ray diffraction pattern of solid solutions formed in Examples 9–11.

FIGURE 7 shows the X-ray patterns of the solid solutions of Examples 9, 10, and 11, and clearly shows the differences which characterize these products.

EXAMPLE 12

Using the method of acid pasting followed by reflux in a solvent, as shown in detail in Example 9, the following mixtures of substituted quinacridones with quinacridone are treated to form solid solutions which had unique and unpredictable properties:

A. 20 parts quinacridone
   80 parts 4,11-dibromoquinacridone
B. 10 parts quinacridone
   90 parts 4,11-dimethoxyquinacridone
C. 50 parts quinacridone
   50 parts 3,10-dichloroquinacridone
D. 16 parts quinacridone
   84 parts 3,10-dimethylquinacridone
E. 50 parts quinacridone
   50 parts 2,3,9,10-tetrachloroquinacridone
F. 20 parts quinacridone
   80 parts 3,4,10,11-tetrachloroquinacridone
G. 33 parts quinacridone
   67 parts 3,4,10,11-tetramethylquinacridone

EXAMPLE 13

Using the method of Example 9, the following mixtures of substituted quinacridones readily form solid solutions with unique properties:

A. 33 parts 4,11-difluoroquinacridone
   67 parts 3,4,10,11-tetrachloroquinacridone
B. 16 parts 4,11-dichloroquinacridone
   84 parts 4,11-dimethoxyquinacridone
C. 84 parts 4,11-dichloroquinacridone
   16 parts 2,9-dichloroquinacridone
D. 16 parts 4,11-dichloroquinacridone
   84 parts 3,4,10,11-tetrachloroquinacridone E. 50 parts 4,11-dimethylquinacridone
  50 parts 4,11-dimethoxyquinacridone
F. 10 parts 2,9-dimethylquinacridone
  90 parts 2,9-dimethoxyquinacridone
G. 84 parts 3,4,10,11-tetrachloroquinacridone
  16 parts 3,4,10,11-tetramethylquinacridone
H. 20 parts 3,10-dichloroquinacridone
  80 parts 3,4,10,11-tetrachloroquinacridone
I. 20 parts 2,9-dichloroquinacridone
  80 parts 3,4,10,11-tetrachloroquinacridone

EXAMPLE 14

75 parts of quinacridonequinone (prepared by reacting 3 mols of benzoquinone with 2 mols of anthranilic in boiling alcohol, separating the yellow crystalline solid, and cyclizing in hot concentrated sulfuric acid) and 25 parts of linear quinacridone, together with 900 parts of crystalline sodium chloride, are added to a ball mill of suitable dimensions containing about 15,000 parts of "Cylpebs." The charge is milled in a conventional manner for about 48 hours, separated from the "Cylpebs" and extracted in about 4,000 parts of boiling water containing about 125 parts of concentrated $H_2SO_4$. After boiling the mixture for about 2 hours, it is filtered, washed free of soluble salts, and dried at about 60° C. to give a somewhat reddish-yellow pigment of good intensity and good light-fastness. Upon examination by X-rays, this pigment exhibits the following X-ray diffraction pattern:

| Diffraction Angle 2θ (degrees) | Interplanar Spacing (angstroms) | Intensity |
| --- | --- | --- |
| 8.5 | 10.4 | Strong. |
| 14.0 | 6.32 | Do. |
| 17.1 | 5.18 | Weak. |
| 18.5 | 4.79 | Do. |
| 21.5 | 4.13 | Do. |
| 22.3 | 3.98 | Do. |
| 24.4 | 3.65 | Strong. |
| 25.5 | 3.49 | Intermediate. |
| 26.9 | 3.31 | Strong. |

This is substantially the diffraction pattern of pure quinacridonequinone with a slight shift toward larger diffraction angles (smaller interplanar spacings). There are no lines corresponding to the linear quinacridone in the composition.

EXAMPLE 15

A mixture of 40 parts quinacridonequinone and 60 parts linear quinacridone is milled as described in Example 14. The powder, after separation from the "Cylpebs," is added to about 10,000 parts of water containing about 500 parts of concentrated $H_2SO_4$, heated to the boil and boiled for about 30 minutes, filtered hot, washed acid free, and dried. The dry pigment is suspended in 1,000 parts of dimethyl formamide, heated at the boil under reflux for about 20 hours, cooled, filtered, washed free of solvent, and dried to give a maroon pigment of high strength and excellent lightfastness exhibiting essentially the same X-ray diffraction pattern as that of Example 14.

When prepared by this method, mixtures within the range of about 28 to 50 parts quinacridonequinone and 72 to 50 parts linear quinacridone exhibit substantially similar colors and a high degree of lightfastness. However, when the linear quinacridone exceeds about 65 parts, its X-ray diffraction lines begin to appear in the pattern, indicating the presence of some free quinacridone in association with the solid solution. The optimum properties appear to be found in compositions within the range of about 35 to 45 parts quinacridonequinone and 65 to 55 parts quinacridone.

EXAMPLE 16

40 parts of dihydroquinacridone prepared as described in U.S. 2,821,529 is dispersed in 500 parts of water, together with 80 parts of sodium hydroxide. 80 parts of nitrobenzene meta sodium sulfonate is added to the suspension which is then heated to 95° C., preferably in the presence of an antifoam agent, and held at this temperature with good agitation for 6–7 hours. After cooling below 60° C., it is acidified to a pH of 4.0 with about 100 parts of concentrated $H_2SO_4$. It is reheated to about 65° C. and then flooded with several volumes of water, filtered, washed free of salts, and dried to give about 40 parts of a maroon colored pigment which exhibits an X-ray diffraction pattern having strong lines of beta phase quinacridone, together with lines of quinacridonequinone. By analysts, it can be shown to comprise about 60% quinacridone and 40% quinacridonequinone.

The product thus prepared (40 parts) is introduced into a suitable ball mill containing 5,000 parts of "Cylpebs" along with 250 parts of aluminum sulfate

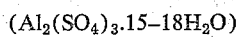

6.5 parts of tetrachloroethylene, and 2 parts of a surface-active agent (Emcol P–10–59—Emulsol Corp.). After milling in a conventional manner for 12 hours, the powder is separated from the "Cylpebs" and extracted for 2 hours at the boil in about 1,600 parts of water containing 100 parts concentrated $H_2SO_4$. On filtering, washing free of sulfate ions and drying, there is obtained 40 parts of a maroon pigment of high strength and excellent lightfastness. Upon examination by X-ray diffraction, the pattern is predominately that of Example 14 together with a line at 6.5°.

EXAMPLE 17

The following mixtures, when treated by the process of Example 15 give solid solutions with characteristic X-ray diffraction patterns:

A. 40 parts linear quinacridone
  60 parts 4,11-difluoroquinacridonequinone
B. 50 parts linear quinacridone
  50 parts 2,9-dichloroquinacridonequinone
C. 50 parts quinacridonequinone
  50 parts 4,11-dimethylquinacridonequinone
D. 50 parts 4,11-dichloroquinacridonequinone
  50 parts 4,11-dimethylquinacridonequinone
E. 60 parts 2,9-dichloroquinacridone
  40 parts 2,9-dichloroquinacridonequinone

EXAMPLE 18

Isoquinacridone is prepared by condensing under the influence of heat 2 mols of formanilide with 1 mol of dimethyl 4,6-dibromo-isophthalate in the presence of $K_2CO_3$ and cupric acetate, followed by hydrolysis in an aqueous solution of sodium hydroxide to give a solution of the disodium salt of 4,6-dianilino-isophthalic acid from which the free acid is isolated by acidification, filtering, washing, and drying. This dianilino derivative is then cyclized by heating in polyphosphoric acid, after which the pigment is precipitated by dilution with water and then isolated in a conventional manner. Substituted isoquinacridones are made in like manner by the use of appropriately substituted aniline derivatives in this process.

50 parts of isoquinacridone and 50 parts of 4,11-dichloroquinacridone are dissolved together in 1,800 parts of concentrated $H_2SO_4$ at room temperature. The solution is then poured rapidly into about 10,000 parts of cold water under good agitation. The precipitate is filtered, washed acid free and dried, after which it is suspended in 3,000 parts of dimethylformamide and heated at the boiling point for 2–4 hours. The solid is removed by filtration, washed free of solvent with water, and dried to give 100 parts of a brilliant orange pigment of good lightfastness.

When treated in a similar manner, a mixture of 20 parts isoquinacridone, 50 parts linear quinacridone, and 30 parts 4,11-dichloroquinacridone yields a solid solution which is also a pigment of a brilliant orange color and good lightfastness.

These two products exhibit substantially the same X-ray diffraction pattern which is essentially that of the scarlet pigment of Example 1.

EXAMPLE 19

The following mixtures, when treated in the same manner as shown in Example 18, give solid solutions with characteristic colors and X-ray diffraction patterns:

A. 33 parts isoquinacridone
   67 parts linear quinacridone
B. 84 parts 2,10-dichloroisoquinacridone
   16 parts linear quinacridone
C. 84 parts 2,10-dichloroisoquinacridone
   16 parts 2,9-dichloroquinacridone
D. 16 parts isoquinacridone
   84 parts 2,10-difluoroisoquinacridone
E. 50 parts isoquinacridone
   50 parts 2,10-dichloroisoquinacridone
F. 67 parts isoquinacridone
   33 parts 2,10-dimethylisoquinacridone
G. 84 parts 2,10-dichloroisoquinacridone
   16 parts 2,10-dimethylisoquinacridone

EXAMPLE 20

When the following mixtures of isoquinacridone and quinacridonequinones are treated by the process of Example 18, solid solutions of characteristic properties are readily formed.

A. 50 parts isoquinacridone
   50 parts quinacridonequinone
B. 60 parts isoquinacridone
   40 parts 2,9-dichloroquinacridonequinone
C. 70 parts isoquinacridone
   30 parts 4,11-difluoroquinacridonequinone

EXAMPLE 21

Another quinacridone derivative which enters into solid solution with other quinacridone compositions when mixtues are treated by the process of Example 18 is dihydroquinacridone, the intermediate in the preparation of quinacridone described in U.S. 2,821,529, as well as its substituted analogs. The following compositions are illustrative of such solid solutions which are notable for the fluorescence introduced in some cases by the dihydroquinacridone.

Figure 8:
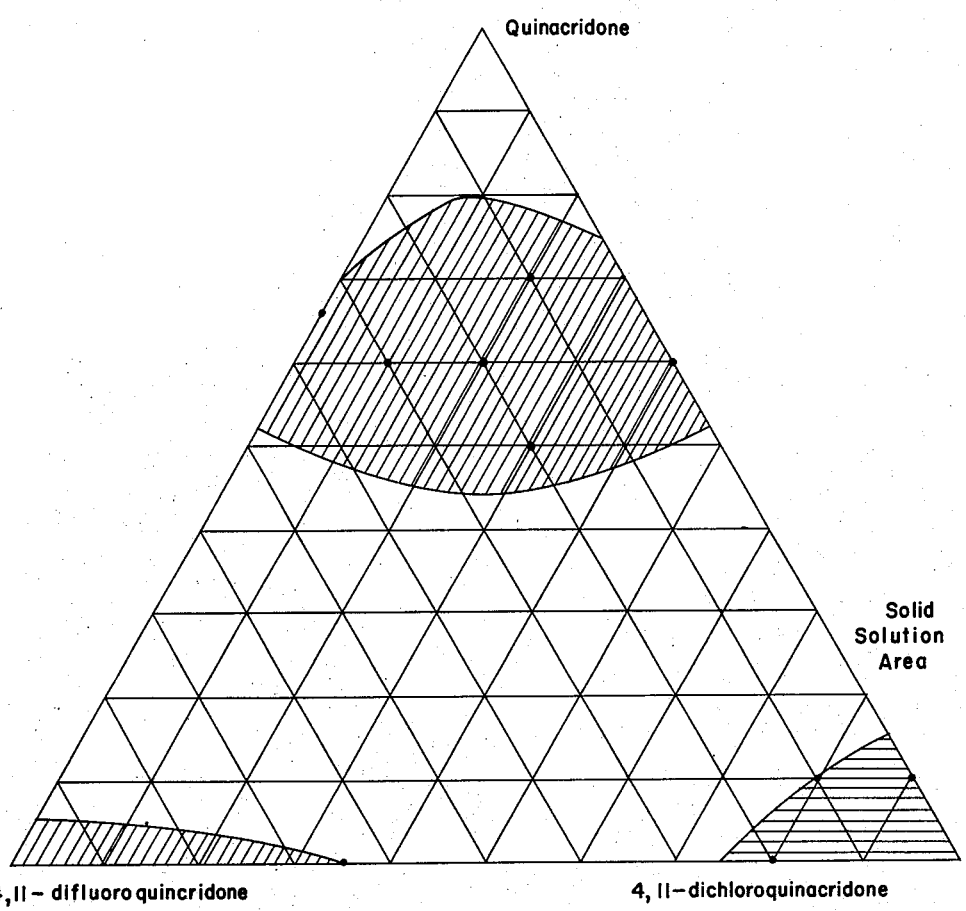
FIGS. 8–10 are composition diagrams for solid solutions of this invention.
Figure 9:
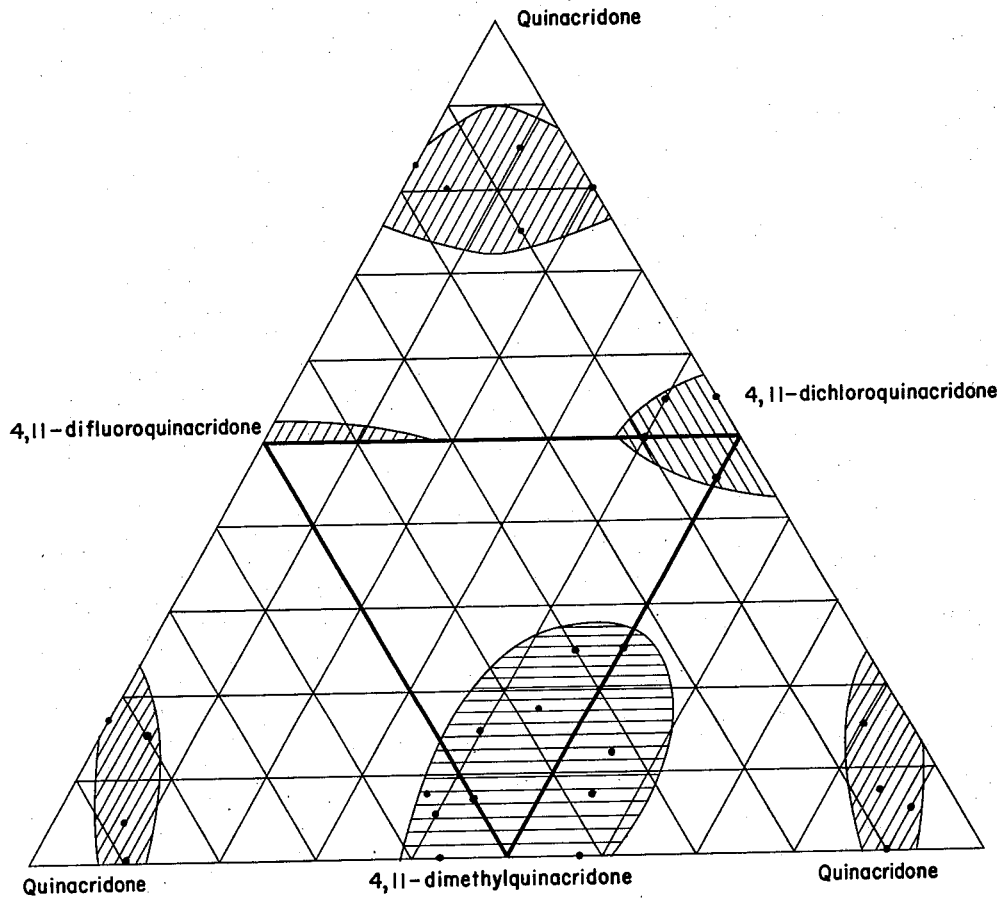
Figure 10:
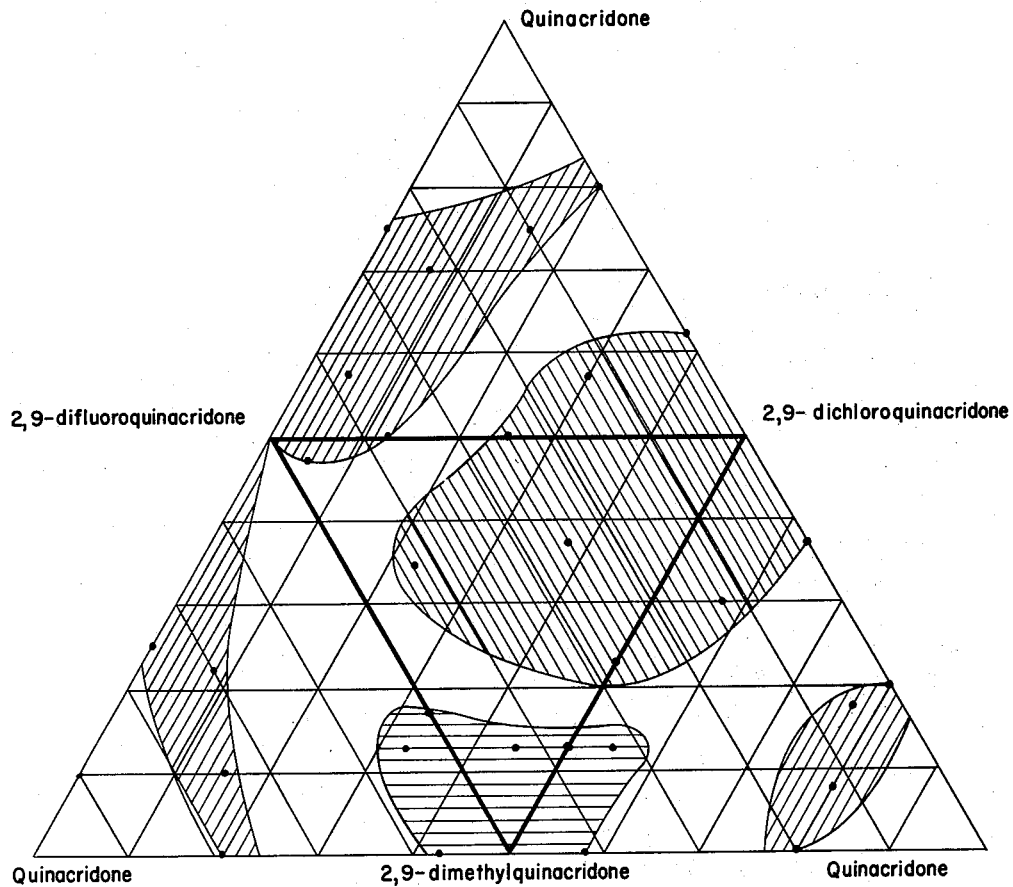

A. 60 parts dihydroquinacridone
   40 parts quinacridone
B. 50 parts 4,11-dimethoxydihydroquinacridone
   50 parts quinacridone
C. 16 parts 4,11-dichlorodihydroquinacridone
   84 parts 4,11-dimethoxyquinacridone
D. 35 parts 4,11-dimethoxydihydroquinacridone
   35 parts quinacridone
   30 parts 4,11-dimethoxyquinacridone
E. 60 parts dihydroquinacridone
   40 parts quinacridonequinone
F. 10 parts 4,11-difluorodihydroquinacridone
   90 parts 4,11-difluoroquinacridonequinone It has been mentioned heretofore that it is possible to vary proportions so as to produce the solid solutions in admixture with the components making up the solutions. Such mixtures are considered to be within the scope of this invention, and FIGS. 8, 9, and 10 are presented to illustrate how varying the proportions of the components affects the end product produced. In all three of these figures, proportions within the shaded areas will result in solid solutions per se; whereas, in the unshaded areas within these diagrams, the process of this invention will produce the solid solutions in admixture with greater or lesser amounts of one or more of the components, depending upon the proportions selected. In certain instances where products are produced from proportions falling in the unshaded area, it may be difficult to differentiate by X-ray study a product which is substantially 100% solid solution from one in which the solution is in admixture with one or more components, since the X-ray diffraction patterns of such products can closely resemble each other. However, in other instances, the proportions used to make the solid solution admixture may be such as to render the X-ray pattern of the solid solution admixture clearly identifiable.

An examination of FIG. 8 will show that it is a conventional ternary diagram in which the corners of the triangle represent the three pure components, quinacridone, 4,11-dichloroquinacridone, and 4,11-difluoroquinacridone, as indicated, and the three sides represent the possible binary mixtures and the area within the triangle represents mixtures containing all three components. There are three shaded areas on this diagram within which products can be obtained which are substantially 100% solid solution.

FIGURE 9 combines in one diagram the four possible ternary diagrams of a four-component system which includes the three components of FIG. 8, and in addition, 4,11-dimethylquinacridone. The central triangle indicated by the heavier lines relates to the three substituted quinacridones, and the outer apexes of each of the three outer triangles are identical points representing quinacridone itself. Thus, the upper triangle is identical with that shown in FIG. 8. The areas shaded with lines parallel to the left side encompass the solid solutions illustrated in Examples 1 to 4, inclusive, each having a characteristic X-ray diffraction which suggests isomorphism with 4,11-difluoroquinacridone. The area shaded with horizontal lines encompasses the products of Examples 5 and 6 having the X-ray pattern of 4,11-dimethylquinacridone, while the small area shaded with lines parallel to the right side includes the products of Example 8.

If the outer triangles of FIGURE 9 are visualized as being folded into the paper to form a tetrahedron, it is then possible to outline a space within the resulting solid in which are represented four component (quaternary) compositions. Example 4J is typical of the possible mixtures which form the solid solution falling within the interior of the tetrahedron.

FIGURE 10 is a composition diagram similar to FIGURE 9 but illustrating the combinations between quinacridone and the 2,9-disubstituted derivatives containing chlorine, fluorine, and methyl groups. It is seen that there are 3 well-defined areas where substantially pure solid solutions are produced.

The procedures used to obtain the solid solutions of this invention utilize the solvent action of certain powerful organic solvents of which dimethylformamide is illustrative. It should be understood that the solubility even in such a powerful solvent is small at best; nevertheless, it is sufficient to enable a slow recrystallization, whereupon the several components enter into the same crystal lattice. Under ideal conditions, it is merely necessary to bring the components into simultaneous contact with the solvent at an elevated temperature, preferably at the boiling point of the solvent. When solid solutions form under these conditions, they tend to approach an ideal equilibrium and frequently form pure solid solutions within a very limited range. Thus, in Example 1, when the proportions are varied as little as 5% on either side of the optimum, the excess component shows up in the X-ray pattern as a physical mixture.

On the other hand, when a mixture of pigments is first dissolved in strong sulfuric acid, as in Example 2, and then drowned into a large volume of water and isolated as a solid in small particle size, such products appear to be especially prone to form solid solutions on exposure to the solvent and the solid solutions frequently form over a much wider range of composition than in the first instance.

Finally, much the same purpose can be served by a combination of salt-milling and solvent treatment as shown in Example 7 wherein particle size reduction is done by salt-milling and the milled powder treated with the solvent prior to removal of the salt therefrom. As a variation on this process, the solvent may be present during the milling.

The solvent used in the examples is dimethylformamide, and it is preferred because of ready availability and economic value. A chemically related solvent, also commercially available, is dimethylacetamide which is equally effective. Other effective solvents are tetramethylene sulfone, dimethyl sulfoxide, ethylene glycol, diethylene glycol, glycerine, aniline, pyridine, quinoline, N,N-dimethylaniline, ethanol amine, ethylene diamine. Generically, these can be classified as strongly polar amides, sulfones, sulfoxides, polyhydroxy compounds and amines.

In all of the examples, a large excess of solvent is shown. There is nothing critical about the amount of solvent used as long as it is sufficient to thoroughly wet the pigment particles and provide sufficient excess to give a fluid suspension which can be agitated. The one exception to this rule is in the case of salt-milling in the presence of the solvent where the solvent should be at least 10% of the weight of the pigment and must not exceed that amount which will permit the charge to retain the characteristics of a dry free-flowing powder.

In the case where salt-milling precedes the treatment with solvent, the milling is an entirely conventional step of particle size reduction in which the mixture of pigments is ground in a ball mill in the presence of from about 4 to about 10 parts of an inert salt (preferably water soluble), such as sodium chloride, for several hours up to as long as, say, 48 hours. After the milling step, it is preferable to add the powder, as discharged from the mill, to dimethylformamide or other solvent followed by a heating step and recovery of the pigment in any conventional manner.

In the case where solution in sulfuric acid is brought about and the pigment reprecipitated in small particle size by rapid dilution with water, it is customary to use at least 5 to 10 parts of sulfuric acid per part of pigment mixture. It usually requires about 10 parts of acid per part of pigment mixture to obtain complete solution, and more may be used if required. The concentration of acid should be at least 90%, and it is advantageous to use the readily available so-called "concentrated" acid of about 96% purity. Oleum may also be used. This operation is entirely conventional in the field of dyes and pigments and not at all critical. The unexpected feature is apparent when the mixtures of quinacridone pigments prepared in such a manner are treated with dimethylformamide or other solvent at elevated temperatures to give the new solid solutions. Another surprising feature of this modification of the process is that solid solutions may be obtained over a considerably wider range of compositions than when the solvent alone is used without the acid pasting step. Thus, when the pigments of Example 1 are put together in this manner, solid solutions showing no excess of either component may be obtained within a range of ratios of quinacridone to 4,11-dichloroquinacridones from about 52/48 to about 75/25 in contrast to the very limited range of compositions shown when the simple hot solvent treatment is used.

In the examples above, the principal emphasis has been placed on the systems comprising solid solutions within the series of quinacridone and its 4,11-dichloro, difluoro, and dimethyl analogs on the one hand and the similar series of quinacridone and its 2,9-disubstituted analogs on the other hand. However, examples are also shown of the use of the dibromo and dimethoxy derivatives in these same series, as well as a number of members in 3,10-disubstituted series, certain tetrachloro and tetramethyl derivatives, as well as solid solutions in which members of different series have participated.

Additional examples include solid solutions in the series comprising quinacridonequinone and its substituted analogs in combination with quinacridone and substituted quinacridones as well as combinations of various quinacridonequinones. Another series of solid solutions contains isoquinacridone and its substituted analogs in various combinations of quinacridone derivatives. Finally, one example shows solid solutions containing the relatively colorless but fluorescent dihydroquinacridone. Thus, the phenomenon of solid solutions containing various combinations of quinacridone compositions is shown to be very general.

Specific illustrations have shown the use of fluorine, chlorine, bromine, methyl and methoxy groups as substituents on the various quinacridone nuclei. These comprise the most readily obtainable derivatives in view of the availability of substituted anilines. However, other lower alkyl and lower alkoxy groups such as the ethyl and ethoxy groups are contemplated as useful substituent groups. Moreover, although the convenient syntheses result generally in symmetrical compounds, it is contemplated that unsymmetrical derivatives such as 4-chloroquinacridone, for instance, may enter into the solid solutions.

The solid solution products of this invention offer certain outstanding advantages in the field of colored pigments. These solid solutions widen the range of hues available in lightfast quinacridone pigments, both towards the orange or yellow side of the spectrum and towards the blue side. Moreover, it is possible to produce solid solution pigments having outstanding lightfastness from materials which by themselves have insufficient light stability to meet the demands of the present-day pigments market.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A composition of matter consisting essentially of a solid solution of components having formulae selected from the group consisting of:

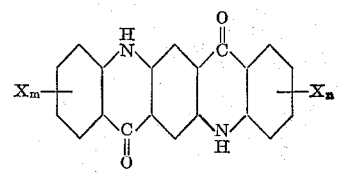

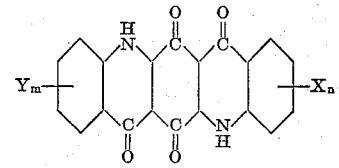

and

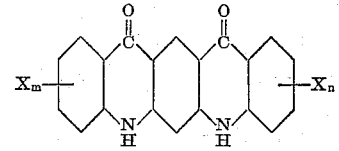

where X is selected from the group consisting of F, Cl, Br, lower alkyl, lower alkoxy, and combinations of these groups, and $m$ and $n$ are integers of from 0–2 both limits being included; said composition being characterized in that the X-ray diffraction pattern thereof is different from the sum of the X-ray diffraction pattern of its constituent quinacridones.

2. The composition of claim 1 in which each of the components of the solid solution has a symmetrical structure.

3. A composition of matter consisting essentially of a solid solution of components having formulae of the structure

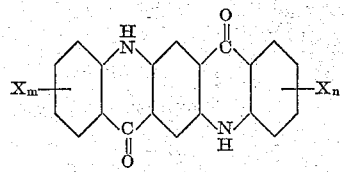

where X is selected from the group consisting of F, Cl, Br, lower alkyl, lower alkoxy, and combinations of these groups, and $m$ and $n$ are integers of from 0–1, both limits being included; said composition being characterized in that the X-ray diffraction pattern thereof is different from the sum of the X-ray diffraction patterns of its constituent quinacridones.

4. A composition of matter consisting essentially of a solid solution of an unsubstituted quinacridone and a 4,11-disubstituted quinacridone wherein both substituents are of the same radical selected from the group consisting of F, Cl, Br, lower alkyl, lower alkoxy and combinations of these groups; said composition being characterized in that the X-ray diffraction pattern thereof is different from the sum of the X-ray diffraction patterns of its constituent quinacridones.

5. A composition of matter consisting essentially of a solid solution of an unsubstituted quinacridone and a 2,9-disubstituted quinacridone wherein both substituents are of the same radical selected from the group consisting of F, Cl, Br, lower alkyl, lower alkoxy and combinations of these groups; said composition being characterized in that the X-ray diffraction pattern thereof is different from the sum of the X-ray diffraction patterns of its constituent quinacridones.

6. A composition of matter consisting essentially of a solid solution of quinacridone and 4,11-dichloroquinacridone; said composition being characterized in that the X-ray diffraction pattern thereof is different from the sum of the X-ray diffraction patterns of its constituent quinacridones.

7. A composition of matter consisting essentially of a solid solution of quinacridone and 4,11-dichloroquinacridone in which the proportion of quinacridone by weight is 55–75%, the balance being essentially 4,11-dichloroquinacridone.

8. A composition of matter consisting essentially of a solid solution of 60% by weight quinacridone and 40% by weight 4,11-dichloroquinacridone.

9. A composition of matter consisting essentially of a solid solution of quinacridone and 2,9-dichloroquinacridone; said composition being characterized in that the X-ray diffraction pattern thereof is different from the sum of the X-ray diffraction patterns of its constituent quinacridones.

10. A composition of matter consisting essentially of a solid solution of quinacridone and 2,9-dimethylquinacridone; said composition being characterized in that the X-ray diffraction pattern thereof is different from the sum of the X-ray diffraction patterns of its constituent quinacridones.

11. A composition of matter consisting essentially of a solid solution of 2,9-dimethylquinacridone and 2,9-difluoroquinacridone; said composition being characterized in that the X-ray diffraction pattern thereof is different from the sum of the X-ray diffraction patterns of its constituent quinacridones.

12. A composition of matter consisting essentially of a solid solution of 2,9-dichloroquinacridone and 2,9-difluoroquinacridone; said composition being characterized in that the X-ray diffraction pattern thereof is different from the sum of the X-ray diffraction patterns of its constituent quinacridones.

13. A composition of matter consisting essentially of a solid solution of quinacridone and quinacridonequinone; said composition being characterized in that the X-ray diffraction pattern thereof is different from the sum of the X-ray diffraction patterns of its constituent quinacridones.

14. A composition of matter consisting essentially of a solid solution of quinacridone and quinacridonequinone in which the proportion of quinacridone by weight is 55–65%, the balance being essentially quinacridonequinone.

15. A composition of matter consisting essentially of a solid solution of 60% by weight quinacridone and 40% by weight quinacridonequinone.

16. A pigment composition consisting essentially of at least 2 different linear quinacridones of the formula

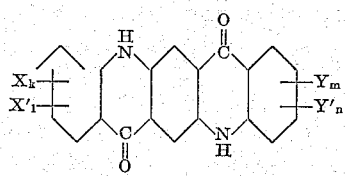

where X, X', Y, and Y' are radicals selected from the group consisting of F, Cl, Br, an alkyl group having 1–4 carbon atoms and an alkoxy group having 1–4 carbon atoms, and where $k$, $l$, $m$ and $n$ are integers from 0–1; said composition being characterized in that the X-ray diffraction patern thereof is different from the sum of the X-ray diffraction patterns of its constituent quinacridones.

17. A composition of matter consisting essentially of a solid solution having as components a quinacridone of the formula:

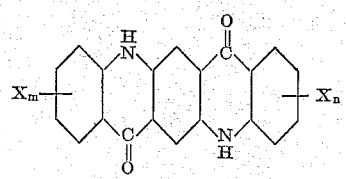

and a quinacridonequinone of the formula:

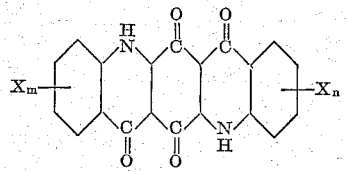

where X is selected from the group consisting of F, Cl, Br, lower alkyl, lower alkoxy, and combinations of these groups, and $m$ and $n$ are integers of from 0–2, both limits being included; said composition being characterized in that the X-ray diffraction pattern thereof is different from the sum of the X-ray diffraction patterns of its constituent quinacridones.

18. The composition of claim 17 in which each of the components of the solid solution has a symmetrical structure.

References Cited in the file of this patent
UNITED STATES PATENTS

| | | |
|---|---|---|
| 2,821,529 | Struve | Jan. 28, 1958 |
| 2,821,530 | Struve | Jan. 28, 1958 |
| 2,844,484 | Reidinger et al. | July 22, 1958 |
| 2,844,485 | Struve | July 22, 1958 |
| 2,844,581 | Manger et al. | July 22, 1958 |